UNITED STATES PATENT OFFICE.

ISIDOR KLIMONT, OF VIENNA, AUSTRIA-HUNGARY.

PROCESS OF MAKING IONON.

SPECIFICATION forming part of Letters Patent No. 637,209, dated November 14, 1899.

Application filed June 16, 1899. Serial No. 720,851. (No specimens.)

*To all whom it may concern:*

Be it known that I, ISIDOR KLIMONT, doctor of philosophy, chemist, residing in Vienna, Austria-Hungary, have invented certain new and useful Improvements in the Manufacture of Ionon and its Homologues, of which the following is a specification.

This invention relates to the manufacture of ionon.

Numerous experiments have shown that citral, an aldehyde of the formula $C_9H_{15}COH$, may be condensed with acetylacetone to a new compound called "acetylpseudoionon" of the formula $C_{15}H_{22}O_2$. The condensation takes place in accordance with the following equation:

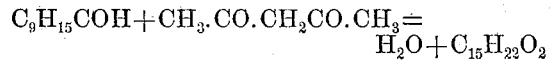
$$C_9H_{15}COH + CH_3.CO.CH_2CO.CH_3 = \\ H_2O + C_{15}H_{22}O_2$$

This condensation is obtained most advantageously in presence of reagents adapted to combine with water in acid solutions—for instance, in presence of acetic acid or butyric acid and of anhydric acetic acid. The acetylpseudoionon thus obtained, when treated at a low temperature with inorganic acids of high percentage, may be converted into acetylionon, whose formula and composition coincide exactly with the above-named acetylpseudoionon, but which differs widely so far as regards the physical and chemical qualities. The acetylionon thus obtained may easily be converted into the well-known ionon by treating it with diluted acids or alkalies.

The following example will serve to explain the process: Forty parts of citral, thirty parts of acetylacetone, fifty parts of concentrated acetic acid, fifty parts of acetate of sodium, and fifty parts of anhydric acetic acid are mixed together and heated in a water-bath for twenty-four hours. After this period the whole mixture is poured into a large vessel containing water, and the latter is separated from the oily matter by decantation. The oil thus obtained is repeatedly rinsed with water and an alkali solution. It is composed of acetylpseudoionon and small quantities of citral and acetylionon, from which the acetylpseudoionon may be freed by blowing steam through the oil until neither citral nor acetylpseudoionon passes over, which can be ascertained by the odor.

As already mentioned, the purified oily matter remaining in the still may be converted in an isomerous compound, the acetylionon. For this purpose acetic acid of eighty per cent., whose quantity is quintuple that of the acetylpseudoionon, is cooled in a refrigerating mixture to 14° Fahrenheit, and the acetylpseudoionon is slowly poured in in drops. During this operation the temperature must, however, not exceed 32° Fahrenheit, as at a lower temperature decomposition of the acetylionon begins to take place. If the whole quantity of acetylpseudoionon has been added to the acid, the mixture remains at rest for some minutes and is poured on ice. The oily matter is then separated from the acid liquor by decantation and is again washed by diluted soda solution. The oily matter thus purified contains acetylionon, which may be obtained by blowing through a jet of steam, whereby an oily matter, which is, in substance, acetylionon, passes over and may be condensed in the well-known manner. The product of this distillation is then extracted by ether and separated therefrom by distillation. At last the pure acetylionon, which shows an agreeable odor, is obtained by distillation *in vacuo* at a pressure of about ten millimeters and a temperature varying between 300° and 320° Fahrenheit.

The transformation of acetylionon into ionon is obtained by heating it in a water-bath with alkaline hydrate solution, whereby ionon and acetate of the respective alkali is obtained. For separating the ionon the ethereous liquor which is obtained by extracting the above mixture with ether is then distilled in the water-bath and the residue obtained dried by the aid of chlorid of calcium and again distilled *in vacuo* at about a pressure of ten millimeters. The vapors passing over at a temperature between 240° and 280° Fahrenheit are received in a condenser and constitute ionon.

I claim—

1. The process of manufacturing ionon, which consists in heating citral and acetylacetone in acid solution and eliminating the water therefrom.

2. The process of manufacturing ionon, which consists in heating citral and acetylacetone in acid solution and in presence of water-extracting means.

3. The process of manufacturing ionon, which consists in heating citral and acetylacetone in acid solution and in presence of reagents adapted to combine with water, and by separating the oily matter obtained.

4. The process of manufacturing ionon, which consists in heating citral and acetylacetone in acid solution and in presence of reagents adapted to combine with water, separating the oily matter obtained and blowing through it a jet of steam in order to free it from the free citral and acetylacetone.

5. The process of manufacturing ionon, which consists in heating citral and acetylacetone in acid solution and in presence of reagents adapted to combine with water, separating the oily matter obtained, blowing through it a jet of steam in order to eliminate the free citral and acetylacetone and dropping the residue in cooled sulfuric acid.

6. The process of manufacturing ionon, which consists in heating citral and acetylacetone in acid solution and in presence of reagents adapted to combine with water, separating the oily matter obtained, blowing through the oily matter a jet of steam in order to eliminate the free citral and acetylacetone, dropping the residue in cooled sulfuric acid, pouring the mixture on ice and decanting the acid layer from the oily one.

7. The process of manufacturing ionon, which consists in heating citral and acetylacetone in acid solution and in presence of reagents adapted to combine with water, separating the oily matter obtained, blowing through the oily matter a jet of steam in order to eliminate the free citral and acetylacetone, dropping the residue in cooled sulfuric acid, pouring the mixture on ice, decanting the acid layer from the oily one, washing the oily matter and blowing through it a jet of steam and condensing the oily matter passing over with the steam.

8. The process of manufacturing ionon, which consists in heating citral and acetylacetone in acid solution and in presence of reagents adapted to combine with water, separating the oily matter obtained, blowing through the oily matter a jet of steam in order to eliminate the free citral and acetylacetone, dropping the residue in cooled sulfuric acid, pouring the mixture on ice and decanting the sulfuric-acid layer from the oily one, washing the oily matter and blowing a jet of steam therethrough, condensing the oily matter passing over with the steam, and distilling the oily matter at a pressure of about ten millimeters and a temperature between 300° and 320° Fahrenheit.

9. The process of manufacturing ionon, which consists in heating citral and acetylacetone in acid solution and in presence of water-extracting means, separating the oily matter obtained, blowing through the oily matter a jet of steam to eliminate the free citral and acetylacetone, dropping the residue in cooled sulfuric acid, pouring the mixture on ice, decanting the sulfuric-acid layer from the oily one, washing the oily matter and blowing a jet of steam therethrough, condensing the oily matter passing over with the steam, distilling the oily matter at a pressure of about ten millimeters and a temperature between 300° and 320° Fahrenheit and heating the product of distillation with an alkaline hydrate, extracting the mixture with ether and removing the ether by distillation.

10. The herein-described process of manufacturing ionon, which consists in heating citral and acetylacetone in acid solution and in presence of reagents adapted to combine with water, separating the oily matter obtained, blowing through the oily matter a jet of steam to eliminate the free citral and acetylacetone, dropping the residue in cooled sulfuric acid, pouring the mixture on ice and decanting the sulfuric-acid layer from the oily one, washing the oily matter and blowing therethrough a jet of steam, condensing the oily matter passing over, distilling the oily matter at a pressure of about ten millimeters and a temperature between 300° and 320° Fahrenheit heating the product of distillation with any alkaline hydrate, extracting the mixture with ether, removing the ether by distillation, and again distilling at a pressure of about ten millimeters, the products of distillation passing over between 240° and 280° Fahrenheit constituting ionon.

In witness whereof I have hereunto signed my name, this 26th day of May, 1899, in the presence of two subscribing witnesses.

ISIDOR KLIMONT.

Witnesses:
 AUGUST CONSTANTIN MAYER, Jr.,
 ALVESTO S. HOGUE.